United States Patent [19]

Lustig et al.

[11] 4,296,156

[45] Oct. 20, 1981

[54] MULTILAYER FILM INCLUDING A POLYURETHANE

[75] Inventors: Stanley Lustig, Park Forest; Stephen J. Vicik, Darien, both of Ill.

[73] Assignee: Union Carbide Corporation, New York, N.Y.

[21] Appl. No.: 106,501

[22] Filed: Dec. 26, 1979

[51] Int. Cl.$^3$ .................. B32B 27/40; C08G 18/42; B65D 81/34
[52] U.S. Cl. ............................... 428/35; 138/118; 138/118.1; 426/105; 426/127; 428/36; 428/220; 428/332; 428/336; 428/337; 428/423.1; 428/423.3; 428/424.6; 428/518; 428/520; 428/522; 428/910
[58] Field of Search ............... 428/423.3, 910, 424.6, 428/35, 36, 522, 520, 518, 423.1, 332, 337, 336, 220; 426/105, 127; 138/118, 118.1

[56] References Cited

U.S. PATENT DOCUMENTS

| | | | |
|---|---|---|---|
| 3,591,561 | 7/1971 | Kazama | 528/76 |
| 3,912,843 | 10/1975 | Brazier | 428/910 |
| 3,956,544 | 5/1976 | Harrington | 428/910 |
| 3,982,986 | 9/1976 | Stone | 428/424.6 |
| 4,123,589 | 10/1978 | Korlatzki | 428/910 |
| 4,178,401 | 12/1979 | Weinberg | 428/35 |
| 4,196,240 | 4/1980 | Lustig | 428/910 |

FOREIGN PATENT DOCUMENTS 54-103475 8/1979 Japan .................. 428/910

*Primary Examiner*—Ellis P. Robinson
*Attorney, Agent, or Firm*—John C. LeFever

[57] ABSTRACT

A flexible biaxially oriented multilayer film includes at least one layer having a thickness of at least about 0.5 mil and consisting essentially of an aromatic polyurethane, the film having been subjected to a biaxial stretching in the range of from about 12 to about 18, preferably about 16.

16 Claims, No Drawings

MULTILAYER FILM INCLUDING A POLYURETHANE

The present invention relates to a flexible biaxially oriented multilayer film, and more particularly to a film which is suitable for being formed into a primal meat bag and is puncture resistant.

Generally, a primal meat cut is a large cut of meat smaller than a side of beef but larger than a typical retail cut sold to a consumer. A primal meat cut is prepared at the slaughter house and then shipped to a retail store or institution such as a restaurant at which the primal meat cut is butchered into smaller cuts of meat.

It is the customary practice to package a primal meat cut for shipment so that the oxygen from the air is inhibited from contacting the meat. This minimizes spoilage and discoloration of the meat.

It is known from the prior art for packaging meat cuts to use a film including a layer serving as an oxygen barrier to protect the meat from spoilage, such as a layer of a polyvinylidene chloride copolymer. The other layers generally provide strength, abrasion resistance, and good low temperature properties.

Other important properties of suitable films include puncture resistance, heat shrink properties, and resistance to delamination at elevated temperatures and during the heat shrinking.

Preferably, the film suitable for primal meat cuts should be capable of being heat sealable so that a bag can be fabricated easily from the film and the heat sealed seams should resist being pulled apart from tension arising during the heat shrinking.

The present invention relates to a flexible multilayer film adapted for use as a primal meat bag and exhibiting a high resistance to puncture which could result from sharp bones.

In accordance with the invention, there is provided a flexible biaxially oriented multilayer film comprising at least one layer having a thickness of at least about 0.5 mil and consisting essentially of an aromatic polyurethane, the film having been subjected to a biaxial stretching in the range of from about 12 to about 18, preferably about 16.

Preferably, the aromatic polyurethane has a melt flow of from about 0.5 to about 12 decigrams per minute at 190° C., more preferably about 2.0 decigrams per minute, and has a Shore hardness A of from about 70 to about 100, more preferably about 80.

Preferably, the film of the invention is a four-layer film comprising a first outer layer of a heat sealable polymer, a first core layer connected to the first outer layer and serving as an oxygen barrier, a second core layer connected to the first core layer and consisting essentially of an aromatic polyurethane, and a second outer layer connected to the second core layer and of a biaxially orientable polymer which adheres to the aromatic polyurethane.

Preferably, the four-layer film has the following layers: The first outer layer is an ethylene vinyl acetate copolymer having a vinyl acetate content of from about 5% to about 18% by weight and having a melt flow of from about 0.2 to about 1.0 decigram per minute.

The first core layer is a polyvinylidene chloride copolymer having at least about 50% by weight of a polymerized vinylidene chloride and containing a maximum of about 5% by weight of a plasticizer. The balance of the polyvinylidene chloride copolymer can be vinyl chloride, acrylonitrile, or an acrylate ester such as methacrylate, or the like.

Preferably, the first core layer comprises a polyvinylidene chloride copolymer having from about 70% to about 90% by weight of a polymerized vinylidene chloride and a minimum of about 2% by weight of a plasticizer. Typically, the plasticizer can be a conventional plasticizer such as dibutyl sebacate and epoxidized soybean oil.

The second core layer is an aromatic polyurethane elastomer having a melt flow of less than about 4.0 decigrams per minute at 190° C. and a Shore hardness A of from about 70 to about 100, preferably about 80.

The second outer layer is the same as the first outer layer.

The overall thickness of the four-layer film is from about 2.0 to about 3.5 mils and preferably about 2.75 mils.

The "biaxial stretching" as used herein is generally the product between the draw ratio in the machine direction (MD) and the stretch ratio in the transverse direction (TD) and is approximately the ratio of the stretch area to the unstretched area. For tubular double bubble extrusion as used in the examples, the TD stretch ratio is the flat width at the upper nip roller of the stretched "bubble" divided by the flat width at the lower nip roller of the unstretched "bubble" or "stem". The MD draw ratio is the speed of the upper nip roller divided by the speed of the lower nip roller.

Illustrative, non-limiting examples of the practice of the invention are set out below. Numerous other examples can readily be evolved in the light of the guiding principles and teaching contained herein. The examples given herein are intended merely to illustrate the invention and not in any sense to limit the manner in which the invention can be practiced. The parts and percentages recited herein and all through this specification, unless specifically stated otherwise, refer to parts by weight, and percentages by weight.

All of the examples were carried out for four-layer films co-extruded through a tubular die and biaxially oriented by conventional methods in accordance with the "double bubble" process such as described in the U.S. Pat. No. 3,555,604 to Pahlke. Each of these four-layer films included a first outer layer of an ethylene vinyl acetate having a vinyl acetate content of about 12% by weight and a melt flow of about 0.3 decigrams per minute. A first core layer of a polyvinylidene chloride copolymer having a vinylidene chloride content of about 83% by weight and a vinyl chloride content of about 17% by weight, a second core layer selected from the polyurethane polymers shown in Table 1, and a second outer layer of an ethylene vinyl acetate having a vinyl acetate content of about 15% by weight and a melt flow of about 0.5 decigrams per minute.

TABLE I

| Aromatic Polyurethane Polymer | Melt Flow at 190° C. | Shore "A" Hardness |
|---|---|---|
| PU A | 12 or more | 80 |
| PU B | 3 to 10 | 80 |
| PU C | 0.5 to 2.0 | 90 |

The main thrust of the instant invention is the achievement of a multilayer film which will exhibit a higher resistance to punctures which can result from sharp bones. The following test was carried out in order to simulate conditions corresponding to the handling and shipping of primal meat bags under which sharp bones can puncture the primal meat bag.

The test device was a dynamic puncture test and was determined to correlate very well with typical conventional tests such as the "drop test". The dynamic puncture test uses a Dynamic Ball Burst Tester, Model 13-a made by Testing Machines Inc. A special tip designed to simulate a sharp bone was built to replace the spherical shaped impact head which forms a part of the original equipment. The equipment measures energy in units of cm-kg.

EXAMPLES 1 to 8

Examples 1 to 8 were carried out with different four-layer films in order to compare the effects of variations in the polyurethane layer.

Table 2 shows a tabulation of the results of the examples 1 to 8.

TABLE 2

| Example | Polyurethane Polymer | Biaxial Stretch | Polyurethane Layer Thickness (mil) | Total Film Thickness (mil) | Dynamic Puncture (kg-cm) |
|---|---|---|---|---|---|
| 1 | PU A | 18 | 0.47 | 2.4 | 4.7 |
| 2 | PU B | 18 | 0.44 | 2.25 | 4.4 |
| 3 | PU C | 18 | 0.27 | 2.0 | 4.5 |
| 4 | PU C | 20 | 0.63 | 2.5 | 6.0 |
| 5 | PU C | 16 | 0.69 | 2.75 | 8.3 |
| 6 | PU C | 16 | 0.69 | 2.75 | 8.3 |
| 7 | PU C | 16 | 0.84 | 3.0 | 9.8 |
| 8 | PU A | 16 | 0.75 | 3.0 | 6.4 |

Examples 1 to 3 show that for the four-layer films in which the polyurethane layer was less than 0.5 mil thick the dynamic puncture resistance was about the same as a typical conventional primal meat film.

Examples 4 and 5 show that there was a substantial increase in the dynamic puncture resistance for a polyurethane layer having a thickness greater than 0.5 mil and that surprisingly the lower level of biaxial stretching resulted in a 38% increase in the dynamic puncture resistance. In contrast, it is conventional practice for polyurethane films to have a biaxial stretching range from about 20 to about 25.

Examples 6 and 7 show that an increase in the thickness of the polyurethane layer results in an increase in dynamic puncture resistance in greater proportion than the increase in thickness. This shows that the primary strength of the four-layer film according to the invention resides in the polyurethane layer.

Examples 7 and 8 show that the higher molecular weight polyurethane as indicated by the lower melt flow of PU C provides a superior dynamic puncture resistance.

We wish it to be understood that we do not desire to be limited to the exact details described herein, for obvious modifications will occur to a person skilled in the arts.

Having described the invention, what we claim as new and desire to be secured by Letters Patent is as follows:

1. A flexible puncture resistant biaxially oriented coextruded multilayer film having a thickness of from about 2.0 to about 3.5 mils comprising at least one layer having a thickness of at least about 0.5 mil and consisting essentially of an aromatic polyurethane elastomer, said film having been subjected to a biaxial stretching in the range of from about 12 to about 18.

2. The multilayer film of claim 1, wherein the biaxial stretching is about 16.

3. The multilayer film of claim 1, wherein said aromatic polyurethane has a melt flow of from about 0.5 to about 12 decigrams per minute at 190° C. and a Shore hardness A of from about 70 to about 100.

4. The multilayer film of claim 1, wherein said aromatic polyurethane has a melt flow less than about 4.0 decigrams per minute and a Shore hardness A of about 80.

5. The multilayer film of claim 1, wherein said film has a thickness of about 2.75 mils.

6. A primal meat bag formed from the film of claim 1.

7. The multilayer film of claim 1, wherein said film has a first outer layer of a heat sealable polymer; a first core layer connected to said first outer layer and serving as an oxygen barrier; a second core layer of said aromatic polyurethane connected to said first core layer; and a second outer layer connected to said second core layer of a biaxially orientable polymer which adheres to said aromatic polyurethane.

8. The multilayer film of claim 7, wherein said aromatic polyurethane has a melt flow of from about 0.5 to about 12 decigrams per minute at 190° C. and a Shore hardness A of from about 70 to about 100.

9. A primal meat bag formed from the film of claim 7.

10. A flexible puncture resistant biaxially oriented coextruded multilayer film having a thickness of from about 2.0 to about 3.5 mils, comprising:
a first outer layer of ethylene vinyl acetate copolymer having a vinyl acetate content of from about 5% to about 18% by weight and having a melt flow of from about 0.2 to about 1.0 decigram per minute;
a first core layer of polyvinylidene chloride copolymer having at least about 50% by weight of a polymerized vinylidene chloride and containing a maximum of about 5% by weight of a plasticizer;
a second core layer of aromatic polyurethane elastomer having a thickness of at least about 0.5 mil; and
a second outer layer of ethylene vinyl acetate copolymer having a vinyl acetate content of from about 5% to about 18% by weight and a melt flow of from about 0.2 to about 1.0 decigrams per minute;
said film having been subjected to a biaxial stretching in the range of from about 12 to about 18.

11. The multilayer film of claim 10, wherein the balance of said polyvinylidene chloride copolymer in said first core layer is selected from the group consisting of vinyl chloride, acrylonitrile and acrylate ester.

12. The multilayer film of claim 10, wherein said first core layer comprises from about 70% to about 90% by weight of a polymerized vinylidene chloride and from about 2% to about 5% by weight of a plasticizer.

13. The multilayer film of claim 12, wherein said plasticizer is selected from the group consisting of dibutyl sebacate and epoxidized soybean oil.

14. The multilayer film of claim 10, wherein said aromatic polyurethane elastomer is said second core layer has a melt flow of less than about 4.0 decigrams per minute at 190° C. and a Shore hardness A of from about 70 to about 100.

15. The multilayer film of claim 14, wherein said Shore hardness A is about 80.

16. The multilayer film of claim 10, wherein said film has a thickness of about 2.75 mils.

* * * * *

UNITED STATES PATENT AND TRADEMARK OFFICE
CERTIFICATE OF CORRECTION

PATENT NO. : 4,296,156

DATED : October 20, 1981

INVENTOR(S) : Stanley Lustig and Stephen J. Vicik

It is certified that error appears in the above—identified patent and that said Letters Patent is hereby corrected as shown below:

Column 4, line 60, for "is" read --in--.

Signed and Sealed this

Second Day of March 1982

[SEAL]

Attest:

GERALD J. MOSSINGHOFF

Attesting Officer  Commissioner of Patents and Trademarks